United States Patent [19]

Deffeyes et al.

[11] 4,092,459

[45] May 30, 1978

[54] POWDER PRODUCTS

[75] Inventors: Robert J. Deffeyes; Grover Lee Johnson, both of Arlington, Tex.

[73] Assignee: Graham Magnetics Incorporated, Graham, Tex.

[21] Appl. No.: 540,521

[22] Filed: Jan. 13, 1975

[51] Int. Cl.[2] .......................... B32B 15/02; B22F 1/02

[52] U.S. Cl. .................................... 428/403; 428/900; 75/.5 B; 75/.5 BB; 148/105; 427/215; 427/216; 427/228; 427/249

[58] Field of Search ....................... 428/403, 404, 900; 148/105; 75/.5 B, .5 BB; 427/215, 216, 228, 249

[56] References Cited

U.S. PATENT DOCUMENTS

| | | | |
|---|---|---|---|
| 3,649,541 | 3/1972 | Ingersoll et al. | 428/900 |
| 3,650,828 | 3/1972 | Higashi et al. | 428/425 |
| 3,671,275 | 6/1972 | Gates et al. | 264/61 |
| 3,740,266 | 6/1973 | Akashi et al. | 428/328 |
| 3,743,499 | 7/1973 | Ramqvist | 75/.5 BB |
| 3,843,349 | 10/1974 | Ehrreich et al. | 148/105 |
| 3,901,689 | 8/1975 | Pelton | 75/.5 B |
| 3,904,448 | 9/1975 | Takahashi et al. | 148/105 |
| 3,932,293 | 1/1976 | Roden | 428/403 |

*Primary Examiner*—William R. Dixon, Jr.
*Attorney, Agent, or Firm*—Robert A. Cesari; John F. McKenna; Andrew F. Kehoe

[57] ABSTRACT

Novel powders, and resinous compositions bearing said powders, characterized by excellent chemical stability, electrical conductivity, and energy-absorbing characteristics. These three characteristics can be utilized, alone or combination, in forming many novel articles including microwave shielding apparatus, magnetic recording media, explosives, and the like. The more advantageous powders are characterized by a very thin coating of an electrically conductive metal carbide, metal silicide, or metal boride upon the surface thereof, and a metal core.

26 Claims, 2 Drawing Figures

POWDER PRODUCTS

BACKGROUND OF THE INVENTION

This invention relates to novel powders comprising coatings of an electrically conductive silicide, carbide, or boride on the surface thereof.

There has been a great deal of inventive effort devoted to producing small, electrically-conductive metal powders for use in electromagnetic energy shielding applications. One of the primary problems to be overcome was to develop a substitute for expensive silver loadings. To this end a number of substitutes were suggested, e.g. silver-coated copper and silver-coated glass. The former material has proved to be the choice in most applications because of its lower cost and high metal content. Nevertheless, because copper tends to migrate into and through the silver powder, eventually form an oxide of high electrical resistivity, work continues in an attempt to provide a suitable alternative to the favored approach.

In a different field of technology other investigators have been working to provide improved ferromagnetic powders for use in magnetic recording media. A great deal of work has been done in an attempt to provide particles of good corrosion resistance and of high magnetic moment. Iron, a particularly desirable candidate for such applications, is not favored because of its susceptibility to corrosion. Therefore most magnetic recording members have been made out of iron oxides. Such relatively exotic materials as "chromium dioxide" and high-cobalt alloys also have been developed for use in magnetic applications. However, where iron itself has been utilized, its potential effectiveness is grossly reduced because of the need to use an extraordinary amount of chemical stabilizers in the formation. Some patents generally descriptive of the work being done in this magnetic recording field include U.S. Pat. Nos. 3,649,541; 3,810,840; 3,586,630; 3,740,266; 3,149,995; 3,650,828; 3,630,771; 3,597,273 and many others.

Materials of improved properties are sought for use not only in the fields described above but also in making conductive formulations for use as flowable "solders", e.g. epoxy solders filled with silver, and the like. The achievement of providing a relatively inexpensive, chemically inert, powder of suitable electrical conductivity or suitable ferromagnetic character has eluded investigators. Gold and silver are still used when excellent chemical resistance or chemical stability are required.

In a hindsight search of prior work, a search made in view of the invention disclosed in this application, it was noted that carbide powders have been used as superconductive fillers (U.S. Pat. No. 3,380,935 to Ring), as fillers in cermets (U.S. Pat. No. 3,723,359), as a conductor in a ceramic material, as non-contacting, yet conductive, particles in a matrix to form a lossy dielectric material. None of these applications suggest the use of carbides or like materials as protective coatings which utilize the morphology of the coating to (1) protect the particulate mass or substrate and (2) to preserve the conductivity of the composition as a whole.

U.S. Pat. No. 3,671,275 to Gates wherein reflection of microwaves is said to be experienced at the expense of absorbing energy when conductive particles are in particle-to-particle contact. Gates relies on relatively small eddy current losses in large SiC particles to absorb energy. Such effects are relatively small when compared to the energy absorption achievable with the magnetic and conductive powders described hereinbelow.

SUMMARY OF THE INVENTION

Therefore, it is an object of the invention to provide novel metal powders having a very thin protective inorganic coating thereon and compositions wherein said particles are present in particle-to-particle contact.

Another object of the invention is to provide improved electrically conductive metal powders for use in electromagnetic energy shielding compositions, e.g. for use in microwave shielding.

Another object of the invention is to provide ferromagnetic powders of improved chemical resistance.

Still other objects of the invention are to provide improved iron-based powders, improved nickel-based powders, and improved cobalt-based powders.

It is also an object of the invention to provide novel processes for making the powders disclosed in the foregoing objects.

Among the other objects of the invention are to provide novel compositions in which the powders of the invention are advantageously embodied and to provide novel products formed of these compositions, e.g. microwave shielding elements such as gaskets and the like, magnetic recording media and other such products wherein major improvements are realized from use of powder having improved chemical stability.

Other objects of the invention will be obvious to those skilled in the art on reading this application.

The above objects have been substantially achieved by forming particles based on any of iron, nickel, cobalt, and other metals which form protective ferromagnetic or electroconductive carbides, silicides, or borides, or the alloys of such metals, with a thin protective coating of the carbide, silicide, or boride over the metal substrate. In general, the basic processes for forming metal carbides, silicides and borides are known in the art. The amount of metal which must be present under the protective surface can vary depending upon the use for which the particle is being prepared. If the use does not require more electrical conductivity than can be contributed by the coating layer, does not require metal for shielding and does not require metal for magnetic purposes, the core underlying the surface-protective layer can be non-metallic. For example, it is entirely possible to form articles according to the invention which are hollow metal spheres with a thin coating of carbide or silicide on the outer surface thereof. Moreover, it is entirely practical to convert metal-coated resins or metal-coated ceramics to particles according to the invention. Also, metal cores of aluminum, of copper, or of other such metals could support thin coatings of iron, nickel, cobalt or other metals which coatings are convertable to protective carbide or silicide coatings.

As will be seen below, the products of the invention can be formed in any shape or size in which a metal surface can be formed. Nevertheless, it is the primary object of this invention to provide materials incorporating small particles, e.g. those passing through a 40-mesh screen or smaller. The greatest advantage is in treating particles of 100 microns average diameter or smaller. The particular morphology of the coatings is particularly advantageous in treating particles of below about 10 microns in average diameter and especially those below one micron in average diameter. It is in these smaller size ranges that severe problems are experienced with respect to providing a treatment which does not substantially effect the properties of an excessive amount of the sub-surface mass of the particles.

Among the novel products of the invention are particulate masses formed of (a) Carbide coated metal powders, e.g. nickel carbidecoated nickel. In such materials the nickel is not as conductive as silver, but the protective carbide is conductive whereas silver's partial coating of oxide is not conductive. Moreover, the carbide is extremely resistant to air and humidity.
(b) Silicide coated powders, e.g. cobalt silicide-coated cobalt.
(c) Boride coated powders, e.g. nickel boride coated nickel.
(d) Electromagnetic energy shielding structures such as gaskets wherein the particle is ferromagnetic or superparamagnetic; e.g., cobalt-carbide coated cobalt. Such materials should have resistivities of below 2500 ohm-centimeters, and advantageously will have resisitivities below 25 ohm-centimeters; indeed as low as 1 ohm-centimeter and lower.
(e) Magnetic recording media.
(f) Compositions wherein said powders are present in particle-to-particle contact, thereby providing electrically conductive compositions.

The coatings must be electrically conductive and chemically inert for use in the formation of electrically conductive compositions according to the invention. Cobalt, nickel and iron form such carbides as have been illustrated above. These three carbides can be formed conveniently at temperatures of about 220° , 250° and 300° C respectively. They have nominal decomposition temperatures of 300° , 370° and 950° C respectively. Although CO is a convenient carbideforming environment, mixtures of hydrogen and CO can also be used conveniently. Those skilled in the art will be able to select other carbide-forming mixtures.

Conductive carbides and silicides of titanium, vanadium, chromium, zirconium, niobium, molybdenum, hafnium, tantalum and wolfram can be utilized as coatings according to the present invention.

There are a number of other metals which form carbide coatings, and would be useful in special circumstances; but which are certain practical disadvantages which limit their utility. For example, manganese carbide decomposes in water; copper carbide is metastable and often used in making detonators for use with explosives. Boron carbide, both inert and conductive, is inconvenient to form because temperatures as high as 2000° C are normally required.

Without wishing to be bound by the theory, it is thought that the advantageous carbide, and silicide coatings of the invention are due to the ability of carbon and silicon to fit interstitically within the metal crystalline lattice of such metals as iron, nickel and cobalt. In any event, it does appear that the conductive coatings have a morphology which is advantageous in formation of extremely thin coatings which protect the metal substrate from chemical deterioration.

Some of the carbide materials, e.g. tantalum, hafnium and zirconium are superconductive at extremely low temperature, say about 5° Kelvin. This fact substantially increases the value of such materials at such reduced temperature levels.

The preferred silicides are generally conductive, having resistivities of only 6 to 200 microohm-centimeters. The lanthanum rare earths form stable and conductive silicides. This is important in special applications, e.g. as wherein samarium alloys like cobalt-samarium alloys can be protected by silicide coatings. Such materials are particularly valuable in making magnetic recording members. On the other hand, molybdenum, cobalt and platinum silicides are superconductors. Silicides of the first long period, e.g. scandium through zinc, are magnetic.

Semiconductors (i.e. those materials which exhibit energy barriers which must be overcome as by a finite voltage before conduction occurs) can be of value in applications where only a chemically inert surface is required; even the semi-conductivity can be of some value in magnetic recording media. In general, however, the conductive coatings are required for the more advantageous application of the invention.

The metallic content of particles is reduced very little by the treatment of the invention. Indeed, even with irregularly shaped sub-micron particles subjected to a rather severe treatment, it is easy to achieve a substantially complete coverage with less than about 40% conversion of metal to the silicide, carbide, or boride. In advantageous applications, it is possible to achieve coverages with as little as 10% even as little as 2% or less of the metal being converted to form a suitable protective composition. In setting out the parameters in this paragraph a wholly metallic particle is used as a model. Clearly, if the particle is formed of a ceramic core, and an outer skin of metal is present, the percent of metal converted to a conductive coating will be much lower.

The general idea remains the same: placement of a thin ohmic layer of material on the surface, a layer that in the most advantageous cases will close to a 3-to-10-atom-thick layer.

In general, the electroconductive powders of the invention combine the advantages of being less costly, more electroconductive, and more corrosion resistant than powders previously available.

One surprising feature of the invention is that a substantially completely protective coating can be achieved in such a short time under such mild processing conditions. One reason for this is believed to be that the surface on which the coating is formed is treated to assure reduction of any oxide coating thereon before the coating reaction.

The extraordinary corrosion resistant character of the coated particles of the invention is also thought to be related to the cessation of the process after a very thin protective surface layer is formed. Disruption of the layer by mass transfer through the layer in an attempt to achieve a deeper coat is substantially avoided. This chemical inert character is of advantage in compositions intended to have a long life — e.f. magnetic tape and energy-absorbing materials. However, it is also of advantage in systems having a high potential for chemical attack on the metal. Oxidizer-bearing explosive compositions are illustrative of such compositions.

It is believed that further processing advantages will be achieved in rotary kilns or other such particle-moving equipment.

A wholly unexpected advantage of the invention appears to be due to a favorable interaction between the treated surface of the particles and the silicone rubber and organic resin matrices into which the particles are loaded. Surprisingly advantageous physical properties are achieved when particles of a given size are loaded into such matrices. The effect seems to be achievable with silicone resins, as well as naturally-occurring and synthetic organic polymers, resins and plastics of the type based on hydrocarbon compounds.

In some functions, e.g. the making of magnetic recording members, the use of an electroconductive coating wholly dispenses with the need for a supplemental conductive pigment such as carbon black, thereby allowing the addition of even more magnetic pigment per volume of magnetic recording composition.

There are a number of various techniques known in the art of formulating electromagnetic solders. All of these techniques can be utilized in making formulations with the powders of the invention. Moreover, there are numerous manipulative techniques in the art for reducing the expense of the metal content of such powders and these too usually can be used in forming powders according to the invention.

The term "resin matrix" as used in the application includes synthetic and naturally-occurring polymers as well as crosslinked resin systems, and any other of the materials generally known as synthetic plastic materials. For most microwave applications, say gaskets and seals, a resilient matrix such as an elastomer will be desirable. For magentic tape coatings, any of the matrices well known in the art can be advantageously utilized. Liquid matrices can be used, e.g. in the formation of electrically conductive solders. Of course, in most applications, such liquid materials will be caused to cure, or solidify by some other technique, after being extruded in a liquid form.

The term "conductive" as used in this application and applying to the coatings on the particles is meant to refer to a coating material which follows ohm's law, specifically those materials which have a resistence that varies approximately linearly with thickness across a layer of the conductor. Even a relatively low conductivity, in the numerical sense, is useful because of the extraordinary thinness of the coatings.

Among the resins that can be used are vinyl polymers, silicone resins natural or synthetic rubber polyurethanes of the elastomeric or crosslinked type, epoxies, and the like. Those skilled in the art fully understand the utilization of all such resins in forming such compositions as contemplated by the inventors.

ILLUSTRATIVE EXAMPLE OF THE INVENTION

In order to point out more fully the nature of the present invention, the following working examples are given as illustrative embodiments of the present process and products produced thereby.

IN THE DRAWINGS

The drawings are included only to meet any formal requirements of disclosure of novel articles claimed under the invention.

Figure 1:
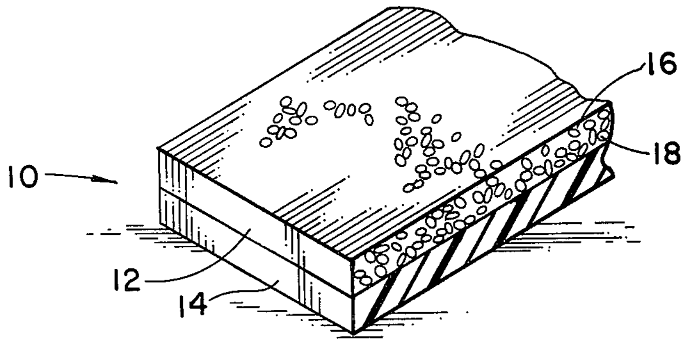
FIG. 1 is a schematic diagram of a magnetic tape formed according to the invention.

FIG. 1 illustrates a segment of magnetic tape 10 comprising a polymeric film substrate 14 and a ferronagnetic composition 12 thereon. Composition 12 comprises a synthetic hydrocarbon-based polymer matrix 16 and ferromagnetic particles formed according to the invention incorporated thereon.

Figure 2:
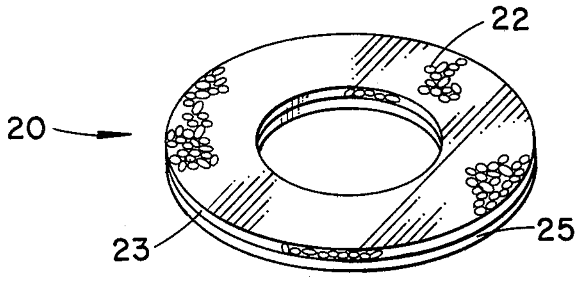
FIG. 2 is a microwave-energy absorbing gasket formed according to the invention.

FIG. 2 illustrates a microwave energy-absorbing shield, a gasket 20. Gasket 20 is mounted on a base 25, but essentially comprises ferromagnetic particles 22 coated with a carbide and incorporated into a cured silicone rubber matrix 23.

EXAMPLE 1

A quantity of 100 grams of nickel powder was placed in a boat and inserted into a tube oven. The powder was about 0.25 inches deep in the boat. (The powder was of the type sold under the trade designation Type/23 nickel powder by International Nickel Company. The powder has a nominal particle size of 4 to 7 microns and a Surface Area of 0.34 square meters per gram.)

After the oven was purged with nitrogen, it was heated to 850° F with hydrogen passing through the oven at a rate of 2400 standard ml per minute for 30 minutes. Gas chromatography showed the moisture level was less than 0.002% by volume. The tube was then cooled to 550° F and carbon monoxide gas was passed over the sample for 1 hour. The tube was purged with nitrogen, cooled and opened. The powder was recovered as a carbide-coated nickel powder.

Four grams of the powder was poured onto a glass surface. Three grams of a silicone rubber sold under the trade designation Silastic 738 RTV by Dow Corning Co. was thoroughly mixed with the powder. The mixture was placed in a disposable plastic syringe and a 1/16 -inch diameter string was extruded onto a watch-glass. This string was cured for 12 hours at 122° F and 50% relative humidity. The cured thread was tested for resistivity with a Micronta Model 22-205 multimeter and found to have a resistance of 42 ohms for a 1 cm spacing, or 3.3 ohm-centimeters.

A sample of the carbide-coated powder was exposed to an atmosphere of air at 160° F and 50% relative humidity for 100 hours with no substantial change in conductivity.

EXAMPLE 2

The same general process described in Example 1 was followed again except that, instead of the metal powder, nickel oxide powder was used. This nickel oxide powder was supplied as a so-called "soluble" powder by International Nickel Company. It typically contains about 77% metal, about 76.5% of which is nickel and cobalt.

The powder required reduction for several hours before the $H_2O$ level of the off gas dropped to 0.0002% by volume, thus indicating that the surface was wholly protected by a metallic coating. After cooling to 550° F, the powder was treated for one hour with CO. The tube was then purged with nitrogen and cooled to room temperature. Upon opening the tube and exposing the sample to room air, no spontaneous heating occurred.

The powder was a carbide-coated nickel, non-pyrophoric and electrically conductive. The magnetic properties were tested. They were:

Coercive Force — 136 oersteds
Squareness — 0.39
Specific Magnetic
Moment — 57 emu/gram Four grams of the powders was mixed with two grams of Dow Corning's Silastic 738. The resultant composition was cured for 1 hour at 160° F and 50% relative humidity. The resistivity was 2.7 ohm-centimeters.

EXAMPLE 3

Superparamagnetic cobalt powder illustrated below has a number of advantages. First, the magneto-crystalline constant, $K_1$, of cobalt is higher than that of nickel and the interaction of cobalt with magnetic component of microwave energy fields is more effective with higher frequency signals than is nickel. Moreover, superparamagnetic cobalt provides higher energy absorption than does ferromagnetic cobalt.

Quantities of 240 grams of cobalt nitrate hexahydrate and 60 grams of zinc sulfate heptahydrate were dissolved in 400 ml of deionized water. The resultant solution was added dropwise, and with agitation, over about 45 minutes to a second solution containing 252 grams of oxalic acid in 1000 ml of water. The resulting precipitate, a cobalt oxalate, was washed. It was then coated, from isopropanol, with a polyamide resin. The resin was that available from AZ Products Inc. of Eaton Park, Fla. under the trademark AZAMIDE 325. A quantity of resin coating is used which is equal to about 7% of the metal content of the oxalate.

The resin-coated oxalate was fired in a tube furnace at 650° F under a nitrogen stream of 2400 ml per minute until the $CO_2$ content of the offgas dropped to 0.02%. Then the temperature was decreased to 540° F and the tube was purged with 2400 standard ml per minute of carbon monoxide for 1 hour. Next, the tube was purged with nitrogen, cooled, and opened. The resulting powder was a mixture of ferromagnetic and superparamagnetic powders. The mixture has a squareness of 0.1 and a coercive force ($H_c$) of 123 measured on a 60 cycle BH loop testing apparatus in a magnetic field of 3000 oersteds. Thus, the characteristic of the mixture was superparamagnetic as confirmed by a dM/dT curve.

EXAMPLE 4

A quantity of 250 grams of cobalt nitrate hexahydrate was dissolved in 400 milliliters of deionized water and then added, dropwise and with agitation, to a solution of 252 grams of oxalic acid dihydrate in 1000 milliliters of deionized water. This addition was carried out in a 1500-ml, baffled Erlenmeyer flask. The precipitate was filtered, washed with 500 ml of deionized water and then washed with 500 ml of isopropanol. The dry precipitate was placed in a tube furnace in a sample boat such that the powder was less than about 0.25-inch deep. The boat was placed in a 2.75-inch diameter stainless steel tube and the tube was placed in a Norton-Marshall 3-inch diameter tube furnace. The powder was reduced to metal under 2400 standard milliliters per minute of gas containing 30 volume percent of hydrogen and 70 volume percent of nitrogen. After the $CO_2$ concentration in the vent gas fell below 0.02%, the gas stream was formed of nitrogen only, and the temperature was lowered to 450° F. Carbon monoxide was then passed over the powder for 1 hour at this temperature. The gas was changed to nitrogen and the tube cooled to room temperature. The tube was opened, to expose the resultant carbide-coated cobalt to air with no spontaneous heating occurring. The specific magnetic moment was found to be 140 emu per gram. Pure cobalt would have a emu value of 161. Thus, the powder was about 87%, by weight, of cobalt metal. The coercive force ($H_c$) of the metal was 279 oersteds, the squareness was 0.67 when measured on a 60 cycle BH loop tester in a 3000-oersted applied field.

The powder was highly conductive: for example, even when electrical leads were merely placed about one inch apart in a loose mass of the powder about ¼-inch in depth, the resistance was only 10 ohms. The powder retained its conductivity after 100 hours exposure at 160° F in air at a 50% relative humidity level.

EXAMPLE 5

A sample of a nickel carbonyl powder having an average prticle size of about 5 micron is placed into a tube furnace and treated with hydrogen to reduce any oxide all according to the general procedure taught in the previous examples.

Thereupon some nitrogen, about 10% based on the volume of hydrogen, is bubbled through silicon tetrachloride and mixed with the steam of hydrogen. The tube is heated up to 1000° C. The treatment is continued for about 1 hour during which time a coating of conductive nickel silicide forms on the nickel powder. Lower temperatures, e.g. 700° C, require somewhat longer reaction times.

The resultant material is highly resistant to corrosive action of humid atmosphere, to acids and to bases. The coating can be dissolved by oxidizing with a solution of hydrogen peroxide.

EXAMPLES 6–8

The same general process as defined in Example 5 is repeated to form cobalt silicide-coated cobalt and to form a mixed metal silicide coating over an alloy comprising about 20% nickel, 20% iron and 60% cobalt. In each instance the silicide is chemically inert and electrically conductive.

EXAMPLE 9

The same procedure as defined in Example 5 is followed excepting that iron is used instead of nickel, boron trichloride is substituted for the silicone tetrachloride and is passed over the metal for a period of 1 hour at a temperature of 400° to 700° C. After the metal powder is cooled, it has a stable relatively-inert, iron boride coating.

EXAMPLES 10–12

The same process as disclosed in Example 5 is repeated to with titanium powder, with vanadium powder and with an 80:20 cobalt nickel alloy. In each case, a stable, electroconductive boride coating is formed on the particle.

EXAMPLE 13

An alloy powder formed of 20% nickel, 20% iron and 60% cobalt is formed by making a mixed metal oxalate salt and reducing it to form the alloy powder. The procedure described in U.S. Pat. No. 3,843,349 is used to form this powder.

Thereupon, the procedure of Example 1 is used to carbidize the outer surface of the iron alloy.

EXAMPLE 14

A sample of nickel carbide was prepared according to the procedure of Example 2. Seven parts of the powder was combined with 0.1 parts of pyrrole in 8 parts of acetone. After thorough mixing, the acetone was allowed to evaporate. The resulting dry iron powder was intimately mixed with 3.5 parts of a silicone resin composition available under the trademark SILASTIC RTV 738 from Dow Corning. The resultant mixtures was formed into a bead of 0.067 inches in diameter. The thread was cured for 16 hours at 160° F and 50% relative humidity. The resistance of the thread was found to be 200,000 ohms with the probes 2 centimeters apart.

This 2-centimeter section of gasket was placed under compressive force and the following resistivities were measured:

| Force | | ohms |
|---|---|---|
| 0 | - | 200,000 |
| 709 grams | - | 10,000 |
| 1769 grams | - | 2,200 |
| 709 grams | - | 10,000 |
| 0 grams | - | 200,000 |

This gasket material is useful in microwave shielding operations and also as an element in a force-measuring load cell. It should be noted that the energy-absorbing characteristics are enhanced with the increase in conductivity experienced when this material is placed under tension or in compression.

EXAMPLE 15

A magnetic coating is prepared by dissolving 8.45 parts by weight of a polyester polyurethane sold under the trade designation Estane 5707 by B. F. Goodrich Company and 2.00 parts by weight of soya lecithin chosen that the total solids content of this solution is 15% in tetrahydrofuran. The solution is charged to a ball mill, 72.5 parts by weight of a carbide-coated cobalt-nickel-iron alloy powder of Example 13 is added and this mixture is milled for 24 hours. Then carbon black, (3.7 parts by weight), lubricants (2.3 parts), catalyst (0.05 parts) and sufficient solvent to reduce the total solids content of the mixture to 35% and milling is continued for 2 more hours. This mixture is drained from the mill, 1 part by weight of a trisocyanate material formed of a polyurethane-type prepolymer with terminal isocyanate functionality and sold under the trade designation Mondur CB-75 by the Mobay Chemical Co. was added and the final mixture applied, by gravure coating, to a 0.001-inch thick polyimide film and dried as before to a thickness of 0.0002 inch.

The resultant coated sheet is subjected to a calendering process between a compliant paper roll and a smooth steel roll, as is well known in the art, to smooth and compact the two coatings and then placed in an oven for 2 hours at 100° C. after which time the crosslinking reactions is complete as will be evidenced by the disappearance of the absorbance band at 2300 $cm^{-1}$ in the infrared spectrum of tetrahydrofuran extracts of the coating and by the insolubility of the coating when subjected to a "rub test" with a Q-tip wet with methyethyl ketone. This completed web is then slit into various widths for testing.

The coating formulation is set forth in Example 1

| Ingredient | Parts by Weight |
|---|---|
| Powder from Example 13 | 72.5 |
| Polyester-polyurethane (Estane 5707) | 8.45 |
| Soya Lecithin | 2.00 |
| Lubricants (Butoxyethyl stearate) | 2.30 |
| Crosslinking Agent CB-75 | 1.00 |
| Catalyst, Ferric Acetyl Acetonate | 0.05 |

EXAMPLE 16

The resultant tape of Example 15 can be stored for many days at 50% humidity and 140° F without any sign of deterioration of the metal powder.

EXAMPLE 17

The storage test of Example 16 is repeated using a silicide-coated iron powder prepared according to the invention. Substantially the same stability is achieved.

EXAMPLE 18

The storage test of Example 16 is repeated using a 80:20:20 iron-nickel-cobalt alloy carbide-coated powder. Again, although only about 2% of the metal has been converted to carbide, the resulting type has extraordinary chemical stability.

EXAMPLE 19

One advantageous aspect of the work of the instant invention is the fact that the magnetic materials are found to absorb much more energy when used in electromagnetic shielding applications than do the silver type materials which have been used heretofor. If one describes a parameter "Q" as the square root of a quantity of energy lost by a shielding medium at a given frequency, it is possible to demonstrate that several times more energy may be absorbed by electromgnetic powders as by other powders.

To illustrate this, a sample coil is formed of six turns of No. 12 copper wire. The coil is formed to have a 2.8 cm diameter and to be 2.8 cm long. This coil is characterized by an inductance of 0.8 microhenrys and a Q-value of 420 at 18 megahertz.

Samples of metallic material were packed in a cylindrical holder formed of 0.25$cm^3$ volume and 0.5 cm in diameter and inserted into the coil. The following results were obtained:

| | Q | ΔQ |
|---|---|---|
| 2 (no sample) | 420 | — |
| 2 (silver powder) | 412 | 8 |
| 2 (powder of Ex 1) | 194 | 226 |

The drop in Q value is indicative of the ability to absorb-energy.

Another coil was prepared using 1 turn of the copper wire. This coil was 1 cm in diameter with 4 cm leads from the turn, it has an inductance of 0.0685 microhenry and a Q value of 213 at 200 megahertz. On placing powder into the field

| | Q | ΔQ |
|---|---|---|
| 2 (no sample) | 213 | — |
| 2 (silver powder) | 152 | 61 |
| 2 (Powder of Ex 1) | 46 | 167 |

This advance is made possible by (1) a realization that prior emphasis on conductivity is not wholly justified in determining efficiency of an electromagnetic energy shielding material: Magnetic permeability is also important and by (2) a way to produce magnetic particles in a chemically-resistant, electrically-conductive mode.

EXAMPLE 20

To illustrate the favorable modification of surface properties achieved by a carbided metal prepared according to the invention, a comparison was made between the alloy described in Example 6 both in its metallic and carbide-coated modes.

In the metallic mode, when the powder was slurried in methylene chloride, it tended to settle out rapidly from the liquid. When treated with carbide, the resultant powder formed a stable suspension with methylene chloride.

EXAMPLE 21

A sample of iron oxide of the type sold under the tradename MO 228 by Charles Pfizer Co. is coated with 15% by weight of a polyamide coating as described in Example 3.

This oxide is then treated in a stream of 60% nitrogen and 40% hydrogen at 725° F until the $H_2O$ in the off-gas indicates that the oxide has been substantially converted to iron metal. Thereupon, the gas stream is converted to 100% CO at 670° for 1 hour.

After being cooled, the resultant powder is a carbide-coated iron having extremely good chemical resistance. For example, the magnetic moment remains substantially constant after exposure of the metal for a week at 160° F and 50% relative humidity.

The magnetic properties of such a metal were: sigma value magnetic moment of 100, a coercivity of 460, and a magnetic squareness of about 0.57.

EXAMPLE 22

The carbided nickel powder of Example 1 was dispersed in a pre-polymerized polyurethane resin sold under the trade designation Estane 5707F1 polyurethane by B. F. Goodrich Chemical Company. The powder comprised 72% by weight of the resultant composition, net, the composition was a readily spreadable paint composition. A film of Mylar was coated with the paint and the paint was dried to a highly-conductive electrical film.

EXAMPLE 23

A carbided iron powder based paint was prepared as disclosed in Example 22. An iron powder was selected which passed through a 325-mesh screen. Thereupon, the powder was treated with hydrogen to provide a clean surface and carbided, as taught, with CO. The resultant powder had a coercivity of about 2 to 3 oersteds.

This iron powder is dispersed in polyurethane and forms a coating material which acts as a magnetic coating suitable for use as a magnetic bulletin board or the like. The coating is readily spreadable over irregular surfaces and irregular articles coated therewith exhibit a soft magnetic character.

It is of course to be understood that the foregoing examples are intended to be illustrative and that numerous changes can be made in the reactants, proportions, and conditions set forth therein without departing from the spirit of the invention as defined in the appended claims.

What is claimed is:

1. A mass of small particles formed of an electroconductive metal core material and comprising, adherent to said core material, a thin coating of an electrically conductive, corrosion resistant, surface layer of electrically conductive carbides, said mass having an electrical resistivity below 2500 ohm cm.

2. A mass of particles as defined in claim 1 wherein said core material is substantially metallic and is selected from the group of metals consisting of cobalt, nickel, iron or alloys of said metals.

3. A mass of particles as defined in claim 2 wherein said carbide coating forms less than about 25% of the mass of said particles.

4. A mass of particles as defined in claim 3 wherein said average diameter of said particles is 5 microns or below.

5. A mass of small particles as defined in claim 3 wherein said mass is superparamagnetic.

6. A mass of small particles as defined in claim 4 wherein said mass is superparamagnetic.

7. A mass of small particles as defined in claim 2, wherein said particles are less than ten microns in average diameter.

8. A mass of small particles as defined in claim 2, wherein said particles comprise less than 10% of carbide.

9. A mass of small particles as defined in claim 2 wherein the electrical resistivity is less than 25 ohm-cm.

10. A mass of particles as defined in claim 1 wherein said carbide coating forms less than about 25% of the mass of said particles.

11. A mass of particles as defined in claim 10 wherein said average diameter of said particles is 100 microns or below.

12. A mass of small particles as defined in claim 1 wherein said mass is superparamagnetic.

13. A mass of particles as described in claim 12 wherein said particles have a thickness of carbide of less than about 10 atomic layers of said coating.

14. A mass of particles as defined in claim 12 wherein the electrical resistivity is less than 25 ohm-cm.

15. A mass of particles as described in claim 1 wherein said particles have a thickness of carbide of less than about 10 atomic layers of said coating.

16. A mass of small particles as defined in claim 1, wherein said particles are less than ten microns in average diameter.

17. A mass of small particles as defined in claim 16 wherein the electrical resistivity is less than 25 ohm-cm.

18. A mass of small particles as defined in claim 1, wherein said particles comprise less than 10% of carbide.

19. A mass of small particles as defined in claim 18 wherein the electrical resistivity is less than 25 ohm-cm.

20. A mass of small particles as defined in claim 1, wherein said core material is nickel and said inorganic layer is nickel carbide.

21. A mass of small particles as defined in claim 20, wherein said particles are less than ten microns in average diameter.

22. A mass of small particles as defined in claim 21, wherein said particles comprise less than 10% of carbide.

23. A mass of small particles as defined in claim 22 wherein the electrical resistivity is less than 25 ohm-cm.

24. A mass of small particles as defined in claim 21, wherein said metal is superparamagnetic.

25. A mass of small particles as defined in claim 21 wherein the electrical resistivity is less than 25 ohm-cm.

26. A mass of small particles as defined in claim 1 wherein the electrical resistivity is less than 25 ohm-cm.

* * * * *

UNITED STATES PATENT OFFICE
CERTIFICATE OF CORRECTION

Patent No. 4,092,459 Dated May 30, 1978

Inventor(s) Robert J. Deffeyes; Grover Lee Johnson

It is certified that error appears in the above-identified patent and that said Letters Patent are hereby corrected as shown below:

Col. 3, line 45: change "are" to --have--

Col. 4, line 53: change "e.f." to --e.g.--

Col. 5, line 23: change "magentic" to --magnetic--

Col. 5, line 61: change "ferronagnetic" to --ferromagnetic--

Col. 6, line 46: change "0.0002%" to --0.002%--

Col. 8, line 12: change "steam" to --stream--

Col. 9, line 54: delete "in Example 1" and insert --below--

Col. 10, line 11: change "type" to --tape--

Signed and Sealed this

*Twentieth* Day of *February 1979*

[SEAL]

*Attest:*

RUTH C. MASON
*Attesting Officer*

DONALD W. BANNER
*Commissioner of Patents and Trademarks*